Feb. 21, 1967 R. J. W. KENNELL 3,305,643

IMPULSE SENDER MECHANISM FOR AUTOMATIC TELEPHONES

Filed Oct. 8, 1963 4 Sheets-Sheet 1

IMPULSE SENDER MECHANISM FOR AUTOMATIC TELEPHONES

Filed Oct. 8, 1963 4 Sheets-Sheet 2

Feb. 21, 1967 R. J. W. KENNELL 3,305,643

IMPULSE SENDER MECHANISM FOR AUTOMATIC TELEPHONES

Filed Oct. 8, 1963 4 Sheets-Sheet 3

United States Patent Office 3,305,643

Patented Feb. 21, 1967

3,305,643

IMPULSE SENDER MECHANISM FOR AUTOMATIC TELEPHONES

Richard John William Kennell, Vaucluse, New South Wales, Australia, assignor to Telephone and Electrical Industries Pty. Limited, New South Wales, Australia, a corporation of New South Wales Filed Oct. 8, 1963, Ser. No. 314,729
Claims priority, application Australia, Oct. 11, 1962, 23,115/62
4 Claims. (Cl. 179—90)

This invention relates to automatic telephone dials—impulse sender mechanisms—which are operated by manual selective part rotation of a spring returned impulse actuator. For many years the impulses so created actuated "step by step switches" in the connected telephone exchange which were part of the telephone connecting equipment. Owing to mechanical limitations the "dial" mechanism and the exchange equipment were restricted to a normal operating speed over a range of 9–11 impulses per second (i.p.s.).

Telephone exchange equipment has for some time past been developed to a stage where the modern impulse-acceptance mechanism is capable of receiving and disseminating impulses at least twice the speed of the earlier equipment i.e. at 18–22 i.p.s. This high speed equipment could achieve considerable saving in installation (capital equipment) and operating costs in addition to providing a greatly improved subscriber-service. But dials as constructed hitherto cannot transmit impulses at 18–22 i.p.s.

Whereas the present invention provides a dial which can be easily accurately set to operate at a selected rate of impulses from that of the slowest speed exchange equipment to at least that of the highest speed exchange equipment or at any intermediate speed, i.e. over the extended range of 9–22 i.p.s., or higher. Consequently, the dial is adaptable to all types of automatic telephone equipment at present in use and it opens the way to develop impulse-acceptance and/or electronic mechanisms capable of receiving and disseminating impulses at speeds higher than 18–22 i.p.s.

The object of this invention is achieved by incorporating in a telephone dial sender mechanism wherein an impulse sending wheel is on a main shaft carrying a finger plate and a spring to rotate the shaft in the impulse sending direction, govenor weights on spring arms mounted on a shaft for rotation therewith, a brake cup housing for the weights and means to adjust the effective length of the weight carrying arms and consequently the regulating speed of the governor. The governor shaft is connected by a pinion and gears through a lay shaft to a main gear wheel on the main shaft to which the impulse sending wheel is fixed.

A one-way engaging clutch is incorporated in the main gear wheel. It is arranged to immobilise the governor and associated gears on all forward movements of the impulse sender mechanism thereby effecting a substantial saving in wear of the governor and its gears and permitting overrun at the end of each impulse cycle.

To assure optimum life and lubricationless operation of the dial, its piece-parts and other components have been devised for manufacture in an appropriate plastic, with the exception of its mainshaft, lay-shaft, drive spring, contact-springs and screws, and the like.

One embodiment of the invention is described with reference to the annexed drawings wherein.

Figure 1:
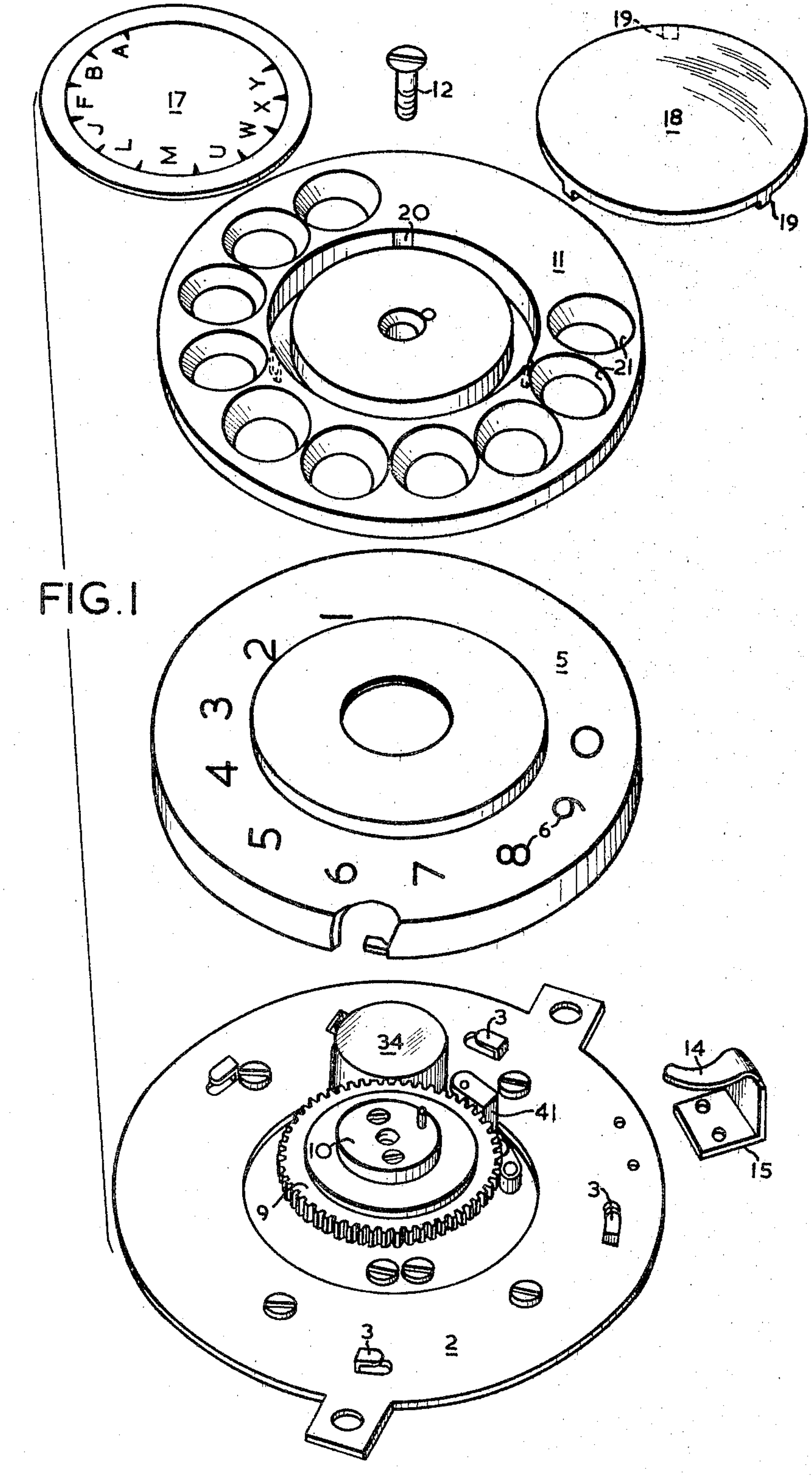
FIGURE 1 is an exploded perspective view of the upper face of a telephone dial base with the several components to be mounted thereon.
Figure 2:
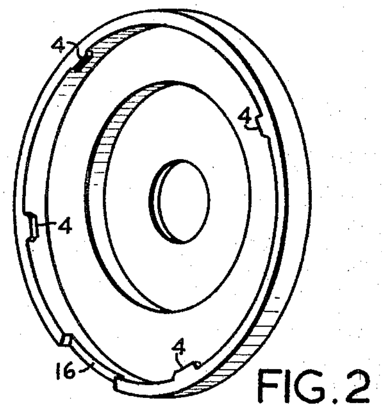
FIGURE 2 is a perspective view from the inside of dial front cover plate.
Figure 3:
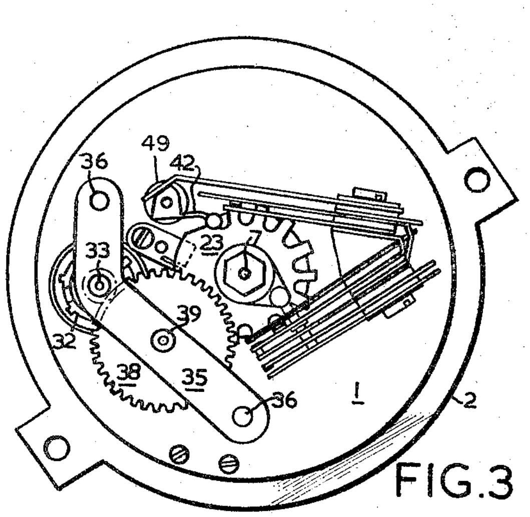
FIGURE 3 is a plan of the back of the dial.
Figure 4:
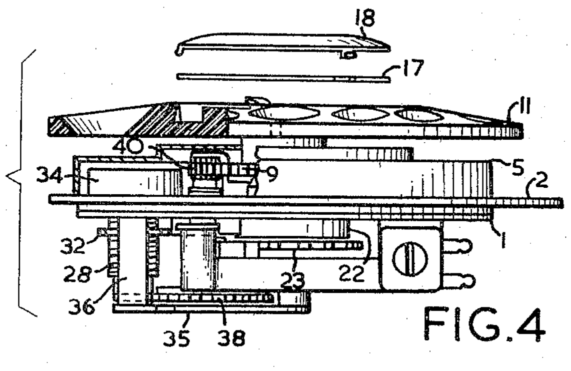
FIGURE 4 is an elevation partly exploded and partly in section of the dial.
Figures 5, 6:
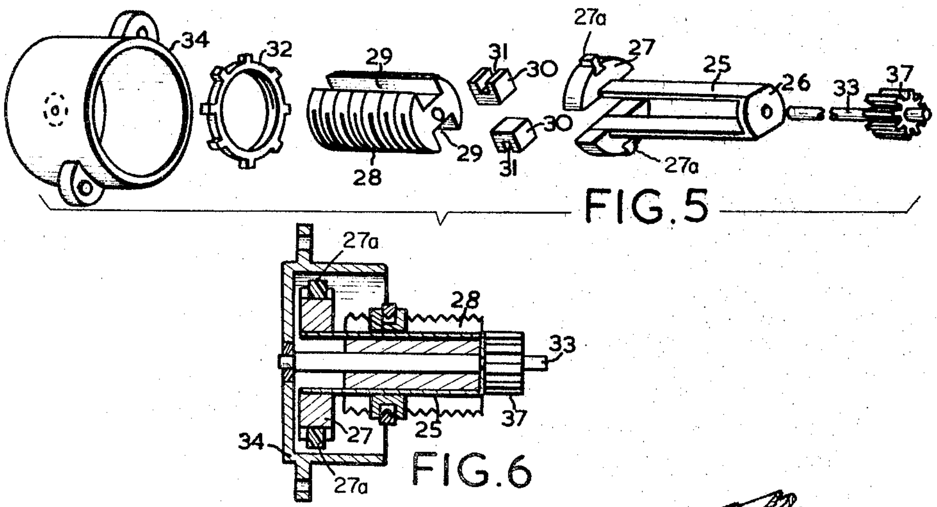
FIGURE 5 is an exploded perspective view of the preferred governor.
FIGURE 6 is a longitudinal sectional elevation thereof.
Figure 7:
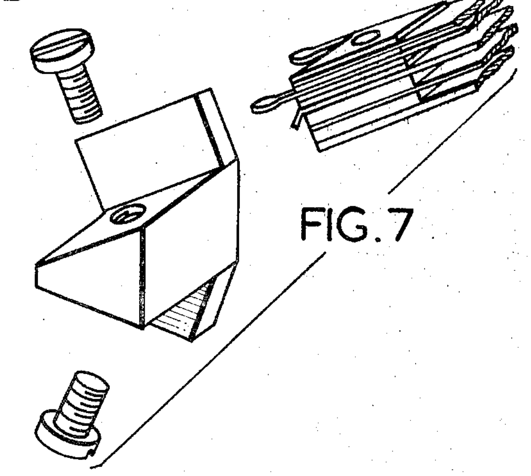
FIGURE 7 is an exploded perspective view of part of the contacts asembly.
Figure 8:
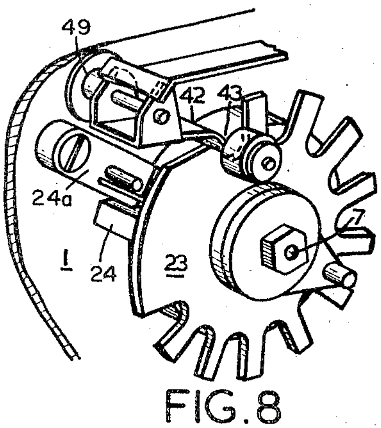
FIGURE 8 is a fragmentary perspective view of the impulse wheel and parts activated thereby.

As illustrated, the dial of this invention incorporates a trigger type impulse sender mechanism which provides a substantial "lost motion" at the commencement of the impulse-train.

The dial consists of a disc base 1 having an annular top plate 2 fixed in spaced relationship thereon. The top plate has bayonet lugs 3 unequally spaced thereon to receive complementary lugs 4 on a dished front-plate 5. The front-plate 5 may have call signs as indicated at 6 thereon which by the construction described are correctly located relative to the impulse sending mechanism when the parts are assembled.

An impulse sending wheel shaft 7 mounted in a bearing 8 on the base 1 has the gear wheel 9 of a one-way clutch mounted on the upper end and a hub 10 on the gear wheel 9 projects through an axial hole in the front-plate 5. A finger plate 11 is mounted on the hub 10. It is held in place by a screw 12 and it is correctly positioned by a locating pin 13 projecting through the hub 10. The front-plate 5, and the finger plate 11 are secured against vandalised removal by finger stop 14 which has a tongue 15 entered into a slot 16 in the front-plate 5 and secured to the top plate 2 by a screw or screws inserted through the base 1. An identification or other form of disc 17 may be retained in a recess in the finger-plate 11 by a transparent cap 18 which is provided with snap-in lugs 19 adapted to enter complementary recesses 20 in the finger-plate 11.

The finger-plate 11 is of sufficient thickness to have the finger holes 21 formed with bevelled edges thus providing a member from which user's fingers are less likely to slip than finger-plates as constructed hitherto.

The impulse-sending wheel shaft 7 incorporating impulse return spring in a housing 22 and the impulse wheel 23 is mounted next to the spring housing 22. A stop 24 on the impulse wheel 23 is adapted to abut a stop **24*a* fixed on the base 1**.

It is preferred to make the spring in the housing 22 of fine gauge approximately 22 gauge stainless-steel spring wire, wound in three concentric layers. Such a spring having a length approximately 48″ has been found to be highly efficient in as much as the tensional difference when dialing any digit from 1 to 0 is negligible and consequently the torsional loading on the governor is minimised.

A governor to selectively control the impulse sending speed as illustrated comprises a two leaf spring arm unit 25 having a head 26 at one end and weights 27 on the other end. Brake shoes **27*a* are fixed on the weights. An externally screwed cylindrical block 28 having two longitudinal slots 29 therein is constructed for insertion between the arms 25 which are freely accommodated in the slots 29. Two flats may be formed on the block 28 in substitution for the slots 29. The term "slots" used hereafter and in the claims shall be deemed to include "flats." A slipper 30 slidable in each slot 29 or on the substituted flats in contact with the respective spring arms 25 has a groove 31 whereby it is operatively connected to a ring nut 32 mounted on the externally screwed block 28. A shaft 33 projects through the head 26 and axially through the block 28 it is supported by one end in a bearing in a cylindrical brake cup 34 fixed in the top plate 2 and by the other end in a bearing bracket 35 fixed on pillars 36 on the base 1. The brake cup 34 is a housing for the weights 27** and limits the throw thereof.

A pinion 37 on the shaft 33 is in engagement with a gear wheel 38 on a lay shaft 39 and a pinion 40 on said lay shaft is in engagement with the gear wheel 9 on the shaft 7. The lay shaft 39 is supported by one end in the bearing bracket 35 and by the other end in a bracket 41 fixed to the base 1.

Figures 9, 10:
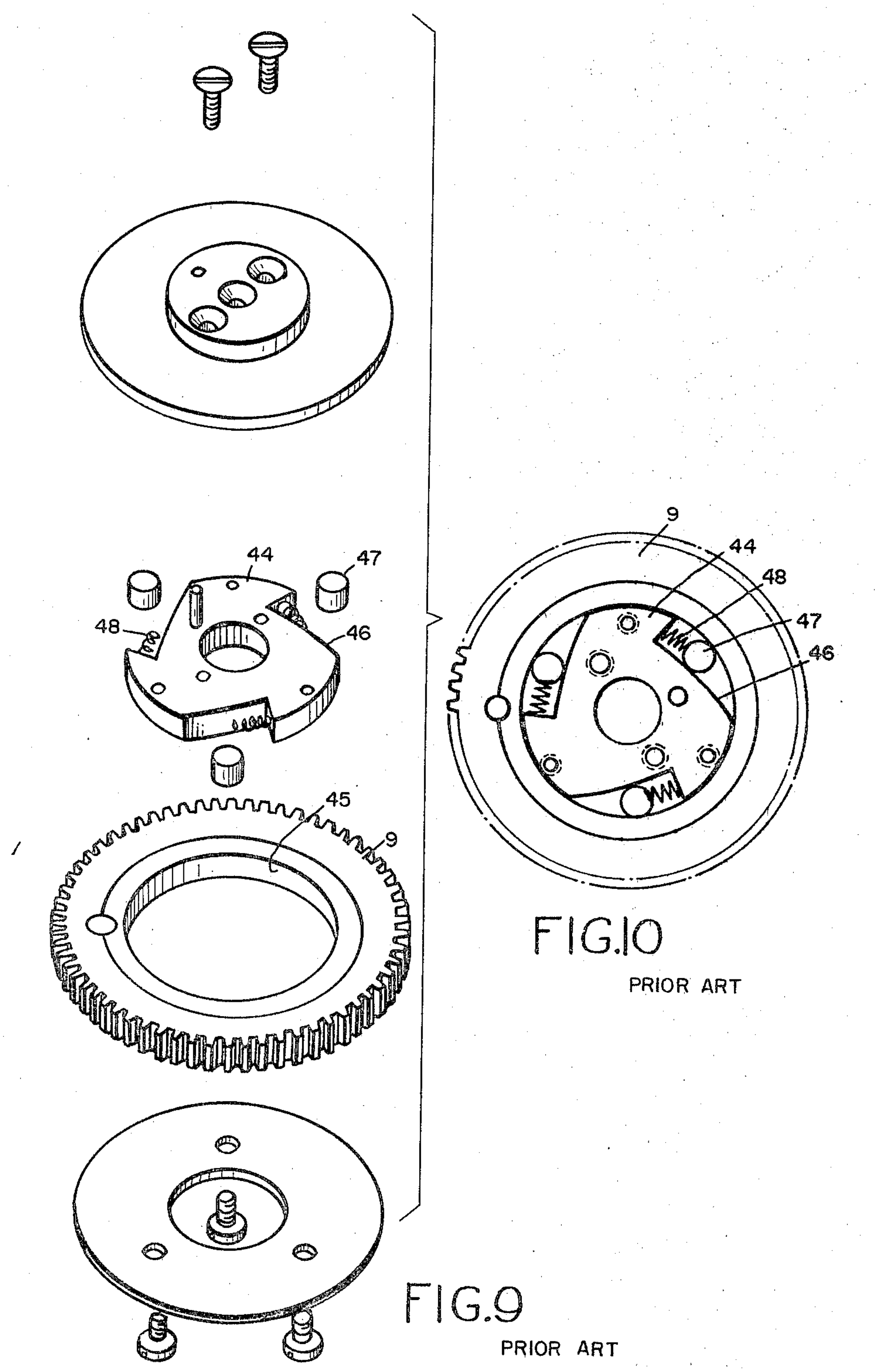
FIG.9, FIG.10 PRIOR ART
FIGURE 9 is an exploded perspective view of a one-way engaging clutch.
FIGURE 10 is an assembled plan thereof with a cover removed.

A one-way clutch of conventional construction is incorporated in the gear wheel 9 (see FIGURES 9 and 10). The clutch illustrated comprises an outer member, which is the gear 9, and an inner member 44 mounted with rotational clearance in a bore 45 in the gear 9. The inner member 44 has an axial bore in which the shaft 7 is fixed and has three ramp cut-outs 46 which form with the bore 45 three housings. A roller 47 located in each housing in combination with a spring 48 urges the rollers towards the small ends of the housings and thus provide a frictional driving connection between the gear 9 and the inner member 44 during part rotation of the member 44 in one direction only. The clutch immobilizes the governor and the gears associated therewith on all forward movements of the impulse sender mechanism and releases to permit over-run of the gears and the governor at the end of each impulse cycle. When so incorporated the clutch achieves the following advantages over the extensively used lay-shaft type clutch, namely:

(a) it rotates at the comparatively slow main shaft speed instead of the higher speed of the lay shaft, or
(b) it immobilises the governor and its gear on all forward movements of the dial;
(c) as a result of (a) and (b) the wear and tear on clutch and gears is appreciably reduced;
(d) it also permits over-run at the end of each impulse cycle.

It is know to incorporate governors in automatic telephone dials with the object of obtaining a uniform rate of impulsing. For dials operating over the range of 9–11 i.p.s. (the practical limit hitherto) the most effective governors rotated at between 90 and 100 revolutions for each rotation of the main shaft, that is between 90 and 100 revolutions per second. The mechanical limitations of these known governors make them completely impractical for operation at the high impulsing speeds envisaged by this invention. The governor of this invention achieves a selective infinitely variable impulsing speed control which is effective for any impulse-acceptance mechanism whether it be the 9–11 i.p.s. or 18–22 i.p.s. or any impulsing speed between these ranges or higher. For example at 9–11 i.p.s. the governor rotates at approximately 43 revolutions per second and at 18–22 i.p.s. it rotates approximately at the rate of 86 revolutions per second. It will be seen that the effective life of the governor of this invention is appreciably longer than that of governors as constructed hitherto.

The governnor is set to control the impulsing speed by rotating the ring nut 32. This regulates the centrifugal force, i.e. the braking effect, of the weights 27 and the brake shoes **27*a* on the wall of the brake cup 34**.

Within the range of 9–11 i.p.s., the standard break-period of each impulse, expressed as a percentage of the total impulse-period, is within the range of 63–70; or an optimum of 66.5 mS; or approximately a 2:1 break/make ratio. Whereas within the range of 18–22 i.p.s. optimum break/make ratio becomes 1.6:1, or 61.5 mS within a range of 58.5–64.5 approximately. It will therefore be seen that a standard 9–11 trigger has an over-lap of approximately 1.5 and vice verso. However, a conventional trigger having an optimum of 64 mS within a range of 61–67 would provide a satisfactory overlap at both 9–11 and 18–22 ranges. In practice, however, it seems certain that the dials of this invention will be required to operate on one or the other speed range and will rarely need to be changed over. Therefore, its trigger has been made with a flange 49 on its inside edge which locates between the trigger-spring and pillar base to permit reading interchangeability. Such triggers can be instantly interchanged by merely lifting the end of the trigger spring slightly, then slide-off the installed trigger and slide-on the desired replacement. It will be appreciated that the standard trigger 42 has a working face V 43 which provides for a "break" ratio of 2:1; i.e. approximately 67 milliseconds (msec.); its optimum performance is at approximately 10 i.p.s. although it will function satisfactorily at higher speeds. However, optimum performance at 20 i.p.s. is obtainable by a trigger having a 1.6:1 "break" ratio i.e. approximately 31 msec. at 20 i.p.s. This is achieved by using another trigger with a smaller V in place of the first-mentioned trigger.

I claim:

1. Impulse sender mechanism for automatic telephones, said mechanism comprising an impulse sending wheel on a shaft carrying a finger plate and a spring to rotate the shaft in the impulse sending direction, a governor to selectively control the impulse sending speed, said governor comprising at least two spring arms fixed by one end to a head and each having a weight on the other end, a brake cup housing for said weights, an externally screwed cylindrical block having two longitudinal slots in the wall thereof, said cylindrical block being inserted between said arms with the arms free in the slots, a slipper slidable in each slot in contact with said arms and movable by a ring nut on said externally screwed cylindrical block, a shaft projecting through said head and axially through said cylindrical block, a pinion on said shaft in engagement with a gear wheel on a lay shaft and a pinion on the lay shaft in engagement with a gear wheel on the impulse sending wheel shaft, said three shafts being mounted in lubricationless bearings made of plastic bearing material, a one-way clutch in the gear wheel on the impulse sending wheel shaft arranged to immobilise the governor and associated gears on all forward movements of the impulse sender mechanism and to permit overrun at the end of each impulse cycle.

2. Impulse sender mechanism for automatic telephones, said mechanism comprising an impulse sending wheel on a shaft carrying a finger plate and a spring to rotate the shaft in the impulse sending direction, a governor to selectively control the impulse sending speed of said mechanism over the range of 9 to 22 impulses per second, said governor comprising two leaf spring arms fixed by one end to a head and each having a weight on the other end with a brake shoe on the weight a brake cup housing for said weights, an externally screwed cylindrical block having two diametrically opposed longitudinal slots in the wall thereof, said cylindrical block being inserted between said arms with the arms free in said slots, a slipper slidable in each slot in contact with the outer face of said arms and in engagement with and movable by a ring nut on said cylindrical block, a shaft projecting through said head and axially through said cylindrical block, a pinion on said shaft in engagement with a gear wheel on a lay shaft and a pinion on the lay shaft in engagement with a gear wheel on the impulse sending wheel shaft, said three shafts being mounted in lubricationless bearings made of plastic bearing material, said pinions and gears being selected to rotate the governor at speeds approximating 43 revolutions per second at 10 impulses per second and 86 revolutions per second at 20 impulses per second, a one way clutch on the impulse sending wheel shaft arranged to immobilize the governor on all forward movements of the impulse sender mechanism, and to permit overrun at the end of each impulse cycle.

3. Impulse sender mechanism for automatic telephones according to claim 2, said mechanism comprising a trigger having a working face V constructed to provide a 1.6:1 break ratio which is approximately 31 milliseconds at 20 impulses per second.

4. Impulse sender mechanism for automatic telephones, said mechanism comprising an impulse sending wheel on a shaft carrying a finger plate and a spring to rotate the shaft in the impulse sending direction, a governor to selectively control the impulse sending speed of said mechanism over the range of 9 to 22 impulses per second, said governor comprising weights on spring arms mounted on a shaft for rotation therewith, a brake cup housing for said weights and means to adjust the effective length of the weight carrying arms and consequently regulating the speed of the governor, said governor shaft being connected by pinions and gears through a lay shaft to a gear wheel on the impulse sending wheel shaft, said three shafts being mounted in lubricationless bearings made of plastic bearing material, said gears and pinions being selected to rotate the governor at speeds approximately 43 revolutions per second at 10 impulses per second and 86 revolutions per second at 20 impulses per second, a one-way clutch arranged to immobilize the governor and associated gears on all forward movements of the impulse sender mechanism and to permit over-run at the end of each impulsing cycle.

References Cited by the Examiner

UNITED STATES PATENTS

| | | | |
|---|---|---|---|
| 1,276,367 | 8/1918 | Ide | 188—184 |
| 1,431,377 | 10/1922 | Dean | 188—184 |
| 1,532,676 | 4/1925 | Blessing | 179—90 |
| 1,642,822 | 9/1927 | Obergfell | 179—90 |

KATHLEEN H. CLAFFY, *Primary Examiner.*

J. W. JOHNSON, A. H. GESS, *Assistant Examiners.*